UNITED STATES PATENT OFFICE.

THOMAS E. PHILLIPS, OF BLOOMINGTON, INDIANA, ASSIGNOR OF ONE-HALF TO BENJAMIN A. McGEE, GEORGE W. BOLENBACHER, PHILIP K. BUSKIRK, AND JAMES KARSELL, OF SAME PLACE, AND JAMES H. DUNN, OF LOUISVILLE, KENTUCKY.

PROCESS OF SEPARATING FIBERS OF REED-CANE.

SPECIFICATION forming part of Letters Patent No. 514,028, dated February 6, 1894.

Application filed February 2, 1893. Serial No. 460,758. (No specimens.)

*To all whom it may concern:*

Be it known that I, THOMAS E. PHILLIPS, of Bloomington, in the county of Monroe and State of Indiana, have invented certain new and useful Improvements in Processes of Separating the Fibers of Reed-Cane; and I do hereby declare that the following is a full, clear, and exact description thereof.

The present invention is an improved process of treating vegetable matters to separate the fibers therefrom, being especially designed to treat reed cane, bamboo and such fibrous woods, but it is also useful in separating fibers in other woods and vegetable products so that the fibers may be obtained in condition for spinning, weaving, &c., and the other resultants or residuum be utilized as fertilizers, or in paper making, or as oakum, &c.

I form a solution of the following ingredients:—Concentrated lye, (potash or crude potassium carbonate containing on analysis, potassium carbonate and potassium hydrate, from thirty-five to fifty per cent. potassium carbonate and from thirty to fifty per cent. potassium hydrate, with impurities of potassium sulphate and chloride, with one to five per cent. sodium carbonate,) of this four pounds; chloride of zinc, (commercially pure,) one pound; tannin, (made from oak barks, boiled to the consistency of coal tar,) of this one pound; petroleum (coal oil 150° to 200° fire test,) one quart; water, forty gallons.

The reed cane is placed in vats (being preferably crushed before being put therein) and is immersed in the solution. If the solution is cold, the desired result—to wit, (disintegration of the woody matters)—is attained in from eighteen to twenty-four hours. By heating the solution the action of the composition is expedited, and at a temperature of about 200° Fahrenheit the desired result will be produced in from seven to twelve hours. The cane may then be removed from the vats and treated by rollers or other suitable means, to separate the fibers from the disintegrated woody substances, preparatory to combing and cleaning.

The solution in the vats may be tested at intervals to ascertain the strength, and revivified if weakened by the addition of the necessary ingredient.

I prefer applying the ingredients all together in one solution for the reason that less time, expense and labor, are involved in reducing the cane, and further, because the mineral salt, chloride of zinc, can be dissolved readily when in solution with other ingredients; but I do not confine myself to the employment of the ingredients in one solution. A larger or smaller quantity of the whole composition may be used in proportion to the amount of cane treated.

Having described my invention, what I claim as new, and desire to secure by Letters Patent thereon, is—

The herein described process of treating reed-cane to obtain fibers therefrom consisting in subjecting the cane to the action of an alkali such as concentrated lye, a hydro-carbon such as petroleum, and a mineral salt such as zinc chloride, and tannin, all in solution, and subsequently separating the fibers from the woody substances, substantially as specified.

In testimony that I claim the foregoing as my own I affix my signature in presence of two witnesses.

THOMAS E. PHILLIPS.

Witnesses:
    JAS. R. MANSFIELD,
    DAVID E. MOORE.